(12) United States Patent
Mezaael

(10) Patent No.: US 11,748,303 B2
(45) Date of Patent: Sep. 5, 2023

(54) SYSTEMS AND METHODS FOR REMOTE STORAGE OF INFORMATION ASSOCIATED WITH A DISTRIBUTED LEDGER NETWORK

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 17/031,370

(22) Filed: Nov. 23, 2020

(65) Prior Publication Data

US 2022/0164310 A1 May 26, 2022

(51) Int. Cl.
*G06F 16/13* (2019.01)
*H04L 9/32* (2006.01)
*H04W 4/44* (2018.01)
*H04L 9/00* (2022.01)

(52) U.S. Cl.
CPC .......... *G06F 16/134* (2019.01); *G06F 16/137* (2019.01); *H04L 9/3236* (2013.01); *H04L 9/3265* (2013.01); *H04W 4/44* (2018.02); *H04L 9/50* (2022.05)

(58) Field of Classification Search
CPC ... G06F 16/134; G06F 16/137; H04L 9/3236; H04L 9/3265; H04L 9/50; H04W 4/44
USPC ........................................................ 707/741
See application file for complete search history.

(56) References Cited

U.S. PATENT DOCUMENTS

| | | | |
|---|---|---|---|
| 11,081,219 B1* | 8/2021 | Dods | G06N 3/0454 |
| 11,631,061 B2* | 4/2023 | Brook | G06Q 10/20 |
| | | | 705/4 |
| 2015/0348169 A1 | 12/2015 | Harris et al. | |
| 2018/0089684 A1 | 3/2018 | McGregor et al. | |
| 2018/0270244 A1 | 9/2018 | Kumar et al. | |

(Continued)

FOREIGN PATENT DOCUMENTS

| | | | | |
|---|---|---|---|---|
| CA | 3057092 A1 * | 6/2020 | | B60R 25/307 |
| CA | 3034719 A1 * | 8/2020 | | G06F 16/1805 |

(Continued)

OTHER PUBLICATIONS

Xueping Liang et al., "Integrating Blockchain for Data Sharing and Collaboration in Mobile Healthcare Applications", IEEE Xplore Digital Library, Oct. 2017, 5 pages.

*Primary Examiner* — Phuong Thao Cao
(74) *Attorney, Agent, or Firm* — Brandon Hicks; Eversheds Sutherland (US) LLP

(57) ABSTRACT

The disclosure is directed to, among other things, systems and methods for remote storage of information associated with a node of a distributed ledger network. In some embodiments, the systems and methods described herein may involve providing, by a first node of a distributed ledger network of nodes and to a first server, first information associated with the first node, wherein the network of nodes includes a network of vehicles. The systems and methods may also involve receiving, by a ledger of the first node and from the first server, a pointer to the first information that is stored at the first server, wherein the pointer is stored in the ledger, and wherein the ledger is a distributed ledger included in all of the nodes of the network of nodes.

4 Claims, 3 Drawing Sheets

(56) References Cited

U.S. PATENT DOCUMENTS

| | | | | |
|---|---|---|---|---|
| 2019/0215163 A1* | 7/2019 | Suleiman | | H04L 9/3247 |
| 2019/0295336 A1* | 9/2019 | Jones | | H04L 67/1042 |
| 2019/0342084 A1* | 11/2019 | Mehedy | | H04L 9/0825 |
| 2020/0005284 A1* | 1/2020 | Vijayan | | H04L 63/08 |
| 2020/0005912 A1* | 1/2020 | Saliman | | G16H 10/60 |
| 2020/0028688 A1* | 1/2020 | Takada | | H04L 9/3239 |
| 2020/0126321 A1* | 4/2020 | Swearingen | | G07C 5/02 |
| 2020/0134760 A1* | 4/2020 | Messerges | | G07C 13/00 |
| 2020/0137064 A1* | 4/2020 | Wu | | G06F 16/182 |
| 2020/0193363 A1* | 6/2020 | Jones | | B60R 25/307 |
| 2020/0211409 A1* | 7/2020 | Latorre | | H04L 9/0861 |
| 2020/0233950 A1* | 7/2020 | Assenmacher | | G06F 21/44 |
| 2020/0288288 A1* | 9/2020 | Lee | | H04W 4/46 |
| 2020/0348923 A1* | 11/2020 | Mezaael | | G06N 5/04 |
| 2021/0089637 A1* | 3/2021 | Cummins | | H04W 12/68 |
| 2021/0182314 A1* | 6/2021 | Hancock | | H04L 9/0643 |
| 2021/0182806 A1* | 6/2021 | Ornelas | | H04L 9/3247 |
| 2022/0012780 A1* | 1/2022 | Leise | | G06Q 40/02 |

FOREIGN PATENT DOCUMENTS

| | | | | |
|---|---|---|---|---|
| CN | 108462568 A * | 8/2018 | | H04L 63/0435 |
| WO | WO-2019078879 A1 * | 4/2019 | | G06F 21/6218 |
| WO | WO-2019078880 A1 * | 4/2019 | | G06Q 10/10 |
| WO | WO-2019236638 A1 * | 12/2019 | | G06F 16/182 |
| WO | WO-2020102246 A1 * | 5/2020 | | H04L 63/0428 |
| WO | WO-2020161510 A1 * | 8/2020 | | G06Q 20/042 |

\* cited by examiner

SYSTEMS AND METHODS FOR REMOTE STORAGE OF INFORMATION ASSOCIATED WITH A DISTRIBUTED LEDGER NETWORK

BACKGROUND

Networks of nodes including a distributed ledger, for example in blockchain applications, may be useful as all of the nodes in the network may have access to a vast amount of shared information. As one example, a fleet of a vehicles may utilize the distributed ledger to store and save vehicle configuration information, which may later be used to quickly configure new vehicles added to the fleet. However, keeping all of this information on the ledger itself may be burdensome to the ledger in that it may require a significant amount of storage space and may also increase processing time.

BRIEF DESCRIPTION OF THE DRAWINGS

The accompanying drawings form part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

DETAILED DESCRIPTION

Overview

Figure 1:
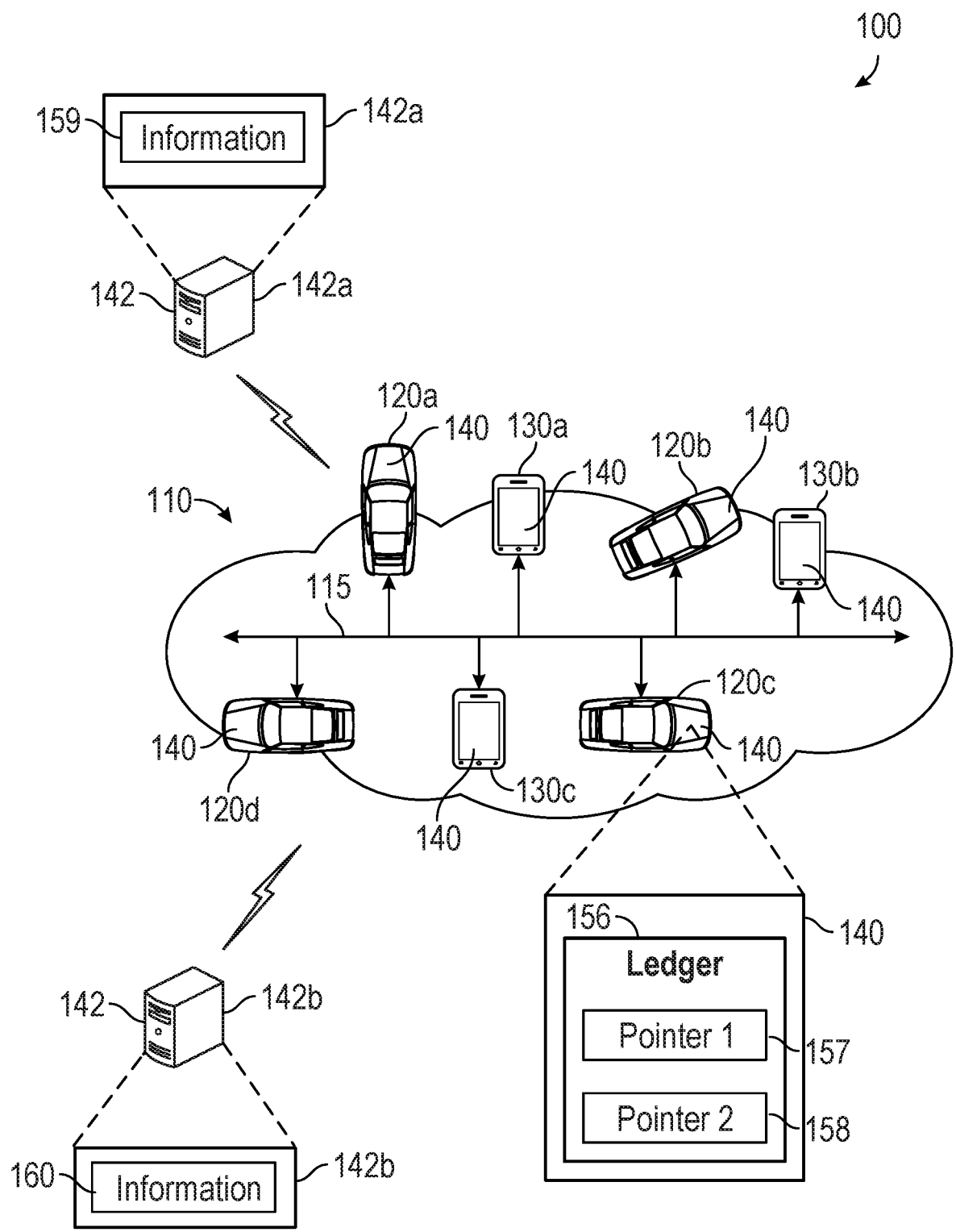
FIG. 1 illustrates an example of an operational environment to supply updated vehicular profile packages, in accordance with one or more embodiments of this disclosure.

The disclosure is directed to, among other things, remote storage of information associated with a distributed ledger network. As an example, the distributed ledger network may include a fleet of vehicles and the information may include vehicle configurations settings for each of the vehicles in the fleet. In this particular example, storing such configuration information may allow for new vehicles that are added to the fleet to be quickly configured based on any number of stored vehicle configuration settings. Additionally, the vehicle configuration settings may be provided to a third party to quickly and easily configure a new fleet of vehicles. In some embodiments, the systems and methods disclosed herein more particularly relate to the reduction of storage space and processing burden on a distributed ledger network (e.g., blockchain) by storing the bulk of the information externally to the ledger and instead replacing the information itself with pointers to the location of the information in the ledger. Although some of the examples provided herein pertain to the network of nodes including a vehicle fleet, the systems and methods described herein may similarly be applied to any other types of nodes.

The information may include information associated with one or more nodes of the distributed ledger network. An example of such information may include proper configuration thresholds for vehicles with respect to their trim levels and type that impact driver habits and performance score (e.g., excessive RPM, harsh acceleration, harsh braking, excessive idling, etc.). These thresholds may be used, for example, by a vehicle fleet manager to track driving behavior of fleet drivers and identify when the thresholds are being surpassed. A second example of such information may include machine learning algorithms that may be used to optimize a vehicle (e.g. ways or strategies to save fuel economy in a fleet vehicle). A third example of such information may include a "vehicle snapshot," which may include a capture of various configuration settings currently stored at the vehicle. For example, it may be desirable to save a particular set of vehicle configurations after configuring a vehicle, so that the configurations can easily be applied to other vehicles. A fourth example of such information may include vehicle module updates (e.g., if a new software revision is released for a vehicle module). A fifth example of such information may include credential and token information regarding modem authorization, or secured certificates. Further examples of such information may be found in U.S. application Ser. No. 16/561,716 titled "AUTOMATED PROVISIONING OF A VEHICLE PROFILE PACKAGE" and/or U.S. application Ser. No. 16/561,686 titled "SYSTEMS AND METHODS FOR NODE CONFIGURATION SETTINGS," which are incorporated herein by reference.

Such information may be sizeable and thus it may be desirable to store this information externally from the ledger (e.g., externally from the blockchain) to reduce storage space requirements and improve processing functionality associated with the blockchain (e.g., improve the hashing rate). In some instances, the information may be stored to one or more remote servers. Additionally, each individual server or individual groupings of servers may be categorically organized such that only certain types of information may be stored at the particular sever or grouping of servers. For example, a first server or group of servers may include ridehail fleet information, a second server or group of servers may include police cruiser fleet information, a third server or group of servers may include electric vehicle (EV) information, etc. Additionally, access to the information on these various servers may be limited to users on a subscription basis such that users may only have access to information on certain servers, or certain types of information on a server(s). This may serve to further reduce complexity and enhance retrieval time for this information.

Once it is determined that a node of the distributed ledger network seeks to store information, the information may be uploaded to a server and a pointer to the location of the information at the server may be stored at the ledger (e.g., at the blockchain) instead of storing the information itself at the ledger. In addition to the pointer, certain other properties may also be stored at the ledger, which may include, for example, the type of server the information was stored to (e.g., the category of information the server includes), the type of information, node information (e.g., vehicle type, etc.), and/or any other relevant identifying information. Once the same node or another node in the network of nodes or external to the network of nodes wishes to access the information (e.g., a vehicle wishes to download the configuration settings to configure itself), the pointer, and/or any of the other identifying information may be used by the particular node to access the information stored at the server. That is, the pointer may be used by the node to determine the server on which the information is stored and/or the particular location on the server at which the information is held. The node may then, based on the pointer, request access to the information from the server, or alternatively the pointer may simply be provided to the server and the server can use the pointer to identify the corresponding information and transmit the information to the node. A communication may be established with the server that may allow the node to download the configuration information from the server to perform the configuration.

This method may help relieve blockchain storage capacity and allow easy authentication of data and information retrieval from servers. This method may also help provide faster and reliable hashing process for mobility blockchain and users to build and track.

Illustrative Embodiments

With reference to the drawings, FIG. 1 is a schematic block diagram of an example of an operational environment 100, in accordance with one or more embodiments of this disclosure. The exemplified operational environment 100 may include a network 110 of nodes 140. In some instances, the nodes 140 may include vehicles and/or mobile devices, or any other type of node (for simplicity, nodes may be interchangeably referred to as vehicles or mobile devices herein, however any other type of node may be equally applicable). The network 110 of nodes 140, for example, may be a vehicle fleet.

As is illustrated in FIG. 1, the network 100 can include a first vehicle 120a, a second vehicle 120b, a third vehicle 120c, a fourth vehicle 120d, or any other number of vehicles. The network 100 also can include a first mobile device 130a, a second mobile device 130b, a third mobile device 130c, or any number of other mobile devices. The network may also include a first server 142a, a second server 142b, or any other number of servers. The network 100 may also include communication media 115. The nodes 140 (for example, vehicles 120a, 120b, 120c, and/or 120d and/or mobile devices 130a, 130b, 130c, and/or 130d) may include at least any of the elements described with respect to FIG. 3 below (for example, one or more processor(s), memory, I/O interface(s), network interface(s), mass storage, etc.). The nodes 140 may also include a ledger 156, for example, in the memory 304 or the mass storage 308.

In terms of the particular types of nodes described above, vehicles (e.g., vehicle 120a, 120b, 120c, and/or 120d) may include driverless autonomous vehicles and/or driver-operated vehicles. In some embodiments, each one of the vehicles can be electric. In other embodiments, each one of the vehicles can rely on an internal combustion engine for locomotion. In yet other embodiments, the vehicles can include electric vehicles and other vehicles having respective internal combustion engines. Additionally, mobile devices (e.g., mobile device 130a, 130b, 130c and/or 130d) may include portable devices, each having computing resources and communication resources that permit sending, receiving, or exchanging data and/or signaling wirelessly with an external electronic device (mobile or otherwise). For instance, the mobile devices can include a mobile telephone (such as a smartphone), a tablet computer, a wearable, a laptop computer, a gaming console, an electronic reader (e-reader); a consumer electronics device having wireless communication functionality; a home appliance having wireless communication functionality; a combination thereof; or similar.

The servers (e.g., server 142a and/or server 142b) may store information associated with any of the nodes 140 on the network 110, such as information associated with any of the vehicles, the mobile devices, or any other nodes. In one non-limiting example, the information may include vehicle fleet updates and up-fitting configurations, which may include vehicle configuration settings. Other examples of information may be as described above. Individual pieces of information stored on one or more of the servers 142a and 142b may be associated with a value, or reference number, used to identify the information. This information may be tied to one or more pointers at the ledger 156 of the network 110, such that a node 140 that seeks to access the information stored on one or more of the servers 142a/142b may retrieve the pointer(s) from the ledger 156 and may ascertain the location of the information on the server 142a and/or the server 142b based on the pointer(s). Alternatively, the node 140 may simply provide the pointer(s) to one or more of the server 142a and server 142b, and the server 142a and/or server 142b may use the pointer(s) to determine what information the node 140 is requesting. The information may then be transmitted to the requesting node 140. This may serve to reduce the storage burden on the ledger 156 and on the nodes 140 as the ledger 156 may only be required to maintain pointers to the information that may be remotely stored on one or more of the servers 142a and server 142b. One specific example may be found in FIG. 1. In FIG. 1, the ledger 156 includes two pointers, a first pointer 157 and a second pointer 158. The first pointer may provide a location of first information 159 stored on the server 142a. The second pointer 158 may likewise provide a location of second information 160 stored on the server 142b. That is, the pointers stored on the ledger 156 may be used by a node 140 of the network 110 to determine where particular information is stored (e.g., on which of servers 142a and/or 142b, as well as a particular location within the servers 142a and/or 142b).

In some instances, information may be categorically stored on the various servers 142a and 142b. For example, server 142a may store information of a first type, and server 142b may store information of a second type. This may serve to further reduce processing time as categorically similar information may be separated by server. As one non-limiting example, server 142a may store police fleet vehicle configuration information and server 142b may store ridehail vehicle information. Thus, if a police cruiser, or an operator of a police cruiser, were to seek to update the vehicle software, the server 142a would be accessed. Additionally, storing different types of information on different servers may allow for a subscription model for accessing the servers. That is, certain nodes 140 or networks of nodes may subscribe to one or more of the servers 142 to be able to access the information on those particular servers 142. Upon a request for information, a server 142 may determine whether the requesting node 140 has permission to view the information on the server 142 based on the subscription status of the node 140. Permission may be based on an indication that the node 140 is allowed to access the server 142. For example, the node 140 may be subscribed to the server 142a, and the server 142a may keep records of all of the nodes that are subscribed to the server 142a. If the node 140 is subscribed to the server 142a, then the information may be accessed. Otherwise, the server 142a may provide an indication to the node that it is unable to access the information. This may ensure that nodes 140 only have access to information that is relevant to them in particular. Nodes 140 may have permission to access some of the servers 142*a* and/or 142*b*, but not others. For example, a particular node 140 may only have access to server 142*a*, which may include a particular type of information, but may not have access to server 142*b*. As a specific use case, the node 140 may be a police cruiser and server 142*a* may store police cruiser configuration information, but server 142*b* may store firetruck configuration information. The police cruiser only needs to have access to the police cruiser configuration information on server 142*a*, so the police cruiser may only have a subscription to that particular server.

The communication media 115 may permit exchanging data and/or signaling wirelessly between nodes in the network 110. That is, the communication media 115 may permit exchanging data and/or signaling between vehicles, between mobile devices, and/or between vehicles and mobile devices in the network 110. The communication media 115 can include communication links, base stations, access points, and/or multiple network devices (such as server devices, gateway devices, and the like). Such a communication media 115 can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication media 115 can also include wired communications, such as through Ethernet, for example.

Finally, the ledger 156 may be a decentralized and distributed information source that may be continuously updated, distributed, and/or stored at the nodes 140. Some or all nodes of the one or more nodes 140 may also have access to and/or have stored the same or a similar ledger 156. This may allow the nodes to be apprised of the same ledger information at any given time. In one particular implementation, the ledger may include information in the form of a blockchain. In such an implementation, blockchain can include one or many blocks of data. Updating the ledger 156 can thus include, for example, adding a block of data corresponding to the to the ledger record. To reduce the amount of information saved at the ledger 156, and thus reduce the storage requirements of each of the nodes 140, information may be stored remotely from the ledger 156 (for example, at server 142*a* and/or 142*b*, or any other location). That is, the ledger 156 may simply include pointers to such information. This may reduce the storage requirements of the nodes 140, while still allowing the nodes 140 to obtain access to the information through the pointers stored in the ledger 156. To this end, the pointers may provide an indication of a location on a remote server at which the information is actually stored. The pointer may be a reference number used to identify a location of the information at the remote location. The pointer may also store any other information, such as any information pertaining to blockchain, such as hash, block number, data structure type, public/private keys, tokens, ledger and server name/number, ID, exact address, etc. Further, the pointer may include a dynamic way for the blockchain ledger to store dynamic information such as hash rate, estimated download rate, estimated upload rate (e.g., how fast or slow or delayed things can be for each user/vehicle or task). This way the pointer may help identify the appropriate time and conditions during user/vehicle journey. Additionally, while the ledger 156 may not include the information itself, the ledger 156 may also store information other than the pointer, such as the type of server the information is stored at, the type of information that is stored, information regarding the type of vehicle the information pertains to, etc.

Example of techniques that emerge from the principles of this disclosure and that can be implemented in accordance with this disclosure can be better appreciated with reference to FIG. 2. For purposes of simplicity of explanation, the exemplified methods in FIG. 2 (and other techniques disclosed herein) are presented and described as a series of operations. It is noted, however, that the exemplified method and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

Figure 2A:
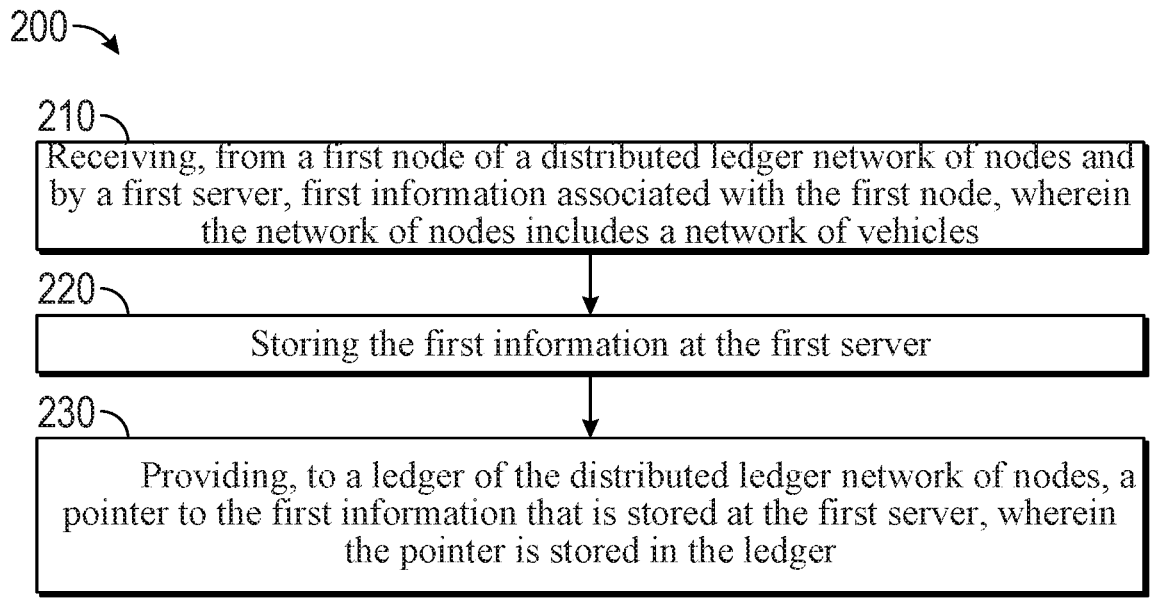
FIGS. 2A and 2B illustrate example methods for supplying updated vehicular profile packages, in accordance with one or more embodiments of this disclosure.

FIG. 2A is a flowchart of an example of a method 200, in accordance with one or more embodiments of this disclosure. A computing device (e.g., computing device 300) included in a server (e.g., server 142*a* and/or 142*b*) can implement, entirely or partially, the example method 200.

At block 210, the computing device included in the computing apparatus can perform operations including receiving, from a first node of a distributed ledger network of nodes and by a first server, first information associated with the first node, wherein the network of nodes includes a network of vehicles. As described above, such information may include, for example, vehicle configuration settings, vehicle up-fitting information, etc. That is, in one particular implementation example, configuration settings for a particular vehicle (e.g., vehicle 120*a*) of the network 110 may be complied for storage and potential later reference by the same vehicle 120*a* and/or any other vehicle's (e.g., vehicle 120*b*) in the network 110. In this same implementation example, a new vehicle (e.g., vehicle 120*c*) may be added to the network 110, and the new vehicle (e.g., vehicle 120*c*)

may access the vehicle 120a configuration information to initially configure itself to the same configuration settings. Alternatively, another vehicle (e.g., 120b) on the network 110 may seek to determine the configuration settings of the vehicle 120a, and thus may have access to such information.

At block 220, the computing device can perform operations including Storing the first information at the first server. As described above, this information might otherwise simply be stored at the ledger 156, for example as a block in a blockchain. However, as described herein, this information may be instead stored to a remote server to reduce the storage space and processing burden on the nodes 140 of the network 110 and their associated ledger 156. That is, the bulk of the information may be stored externally to the ledger 156, but the ledger may include a pointer to the information such that the information is easily accessible by any of the nodes 140. Also as described herein, multiple servers (for example, servers 142a and 142b) may be implemented and each server may include specific categories of information.

At block 230, the computing device can perform operations including providing, to a ledger of the distributed ledger network of nodes, a pointer to the first information that is stored at the first server, wherein the pointer is stored in the ledger. As mentioned above, the pointer may be used by a node 140 in the network 110 to ascertain the location of the information associated with the pointer and may be stored at the ledger 156 in place of the information itself to reduce storage space burden on the ledger 156.

Figure 2B:
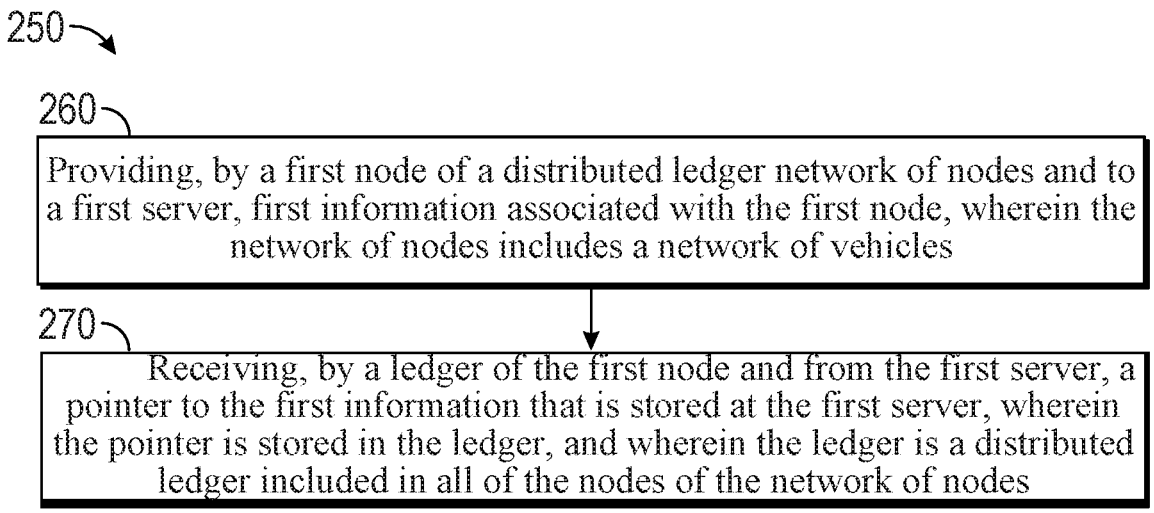

FIG. 2B is a flowchart of an example of a method 250, in accordance with one or more embodiments of this disclosure. A computing device (e.g., computing device 300) included in a node 140 can implement, entirely or partially, the example method 300. That is, method 300 may be similar to method 200, but may instead be performed by a node 140 instead of a server (e.g., server 142a and/or 142b).

At block 260, the computing device included in the computing apparatus can perform operations including providing, by a first node of a distributed ledger network of nodes and to a first server, first information associated with the first node, wherein the network of nodes includes a network of vehicles. At block 270 the computing device included in the computing apparatus can perform operations including receiving, by a ledger of the first node and from the first server, a pointer to the first information that is stored at the first server, wherein the pointer is stored in the ledger, and wherein the ledger is a distributed ledger included in all of the nodes of the network of nodes.

Figure 3:
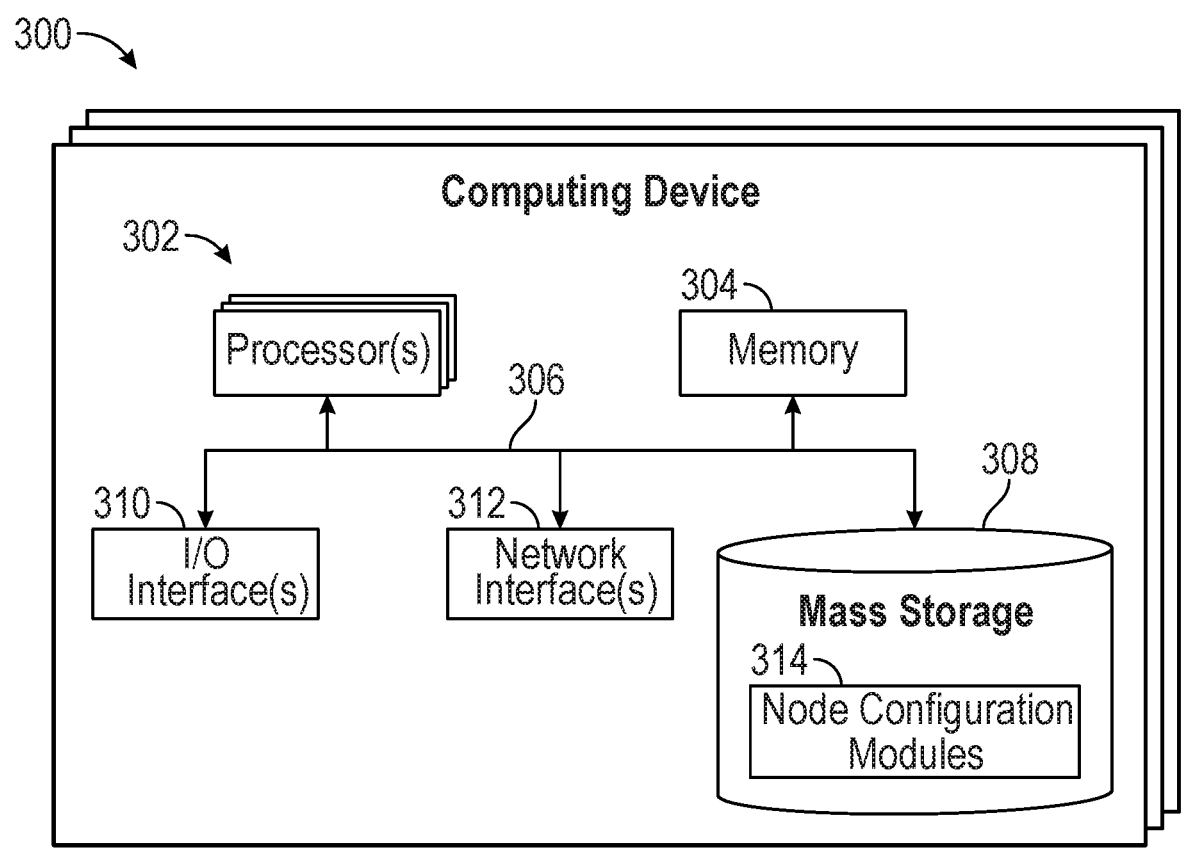
FIG. 3 presents an example of a computing environment for automated configuration of provision of a product or service, in accordance with one or more embodiments of this disclosure.

FIG. 3 illustrates an example computing device 300, in accordance with one or more embodiments of this disclosure. The computing 300 device may be representative of any number of elements described herein, such as any of the nodes 140 and/or any of the servers (e.g., server 142a and/or server 142b). The computing device 300 may include at least one processor 302 that executes instructions that are stored in one or more memory devices (referred to as memory 304). The instructions can be, for instance, instructions for implementing functionality described as being carried out by one or more modules and systems disclosed above or instructions for implementing one or more of the methods disclosed above. The processor(s) 302 can be embodied in, for example, a CPU, multiple CPUs, a GPU, multiple GPUs, a TPU, multiple TPUs, a multi-core processor, a combination thereof, and the like. In some embodiments, the processor(s) 302 can be arranged in a single processing device. In other embodiments, the processor(s) 302 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 302 can access the memory 304 by means of a communication architecture 306 (e.g., a system bus). The communication architecture 306 may be suitable for the particular arrangement (localized or distributed) and type of the processor(s) 302. In some embodiments, the communication architecture 306 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 304 also can retain data, such as any ledger 156 information, among other data.

Each computing device 300 also can include mass storage 308 that is accessible by the processor(s) 302 by means of the communication architecture 306. The mass storage 308 can include machine-accessible instructions (e.g., computer-readable instructions and/or computer-executable instructions). In some embodiments, the machine-accessible instructions may be encoded in the mass storage 308 and can be arranged in components that can be built (e.g., linked and compiled) and retained in computer-executable form in the mass storage 308 or in one or more other machine-accessible non-transitory storage media included in the computing device 300. Such components can embody, or can constitute, one or many of the various modules disclosed herein. Such modules are illustrated as node configuration modules 314.

Execution of the node configuration modules 314, individually or in combination, by at least one of the processor(s) 302, can cause the computing device 300 to perform any of the operations described herein (for example, the operations described with respect to FIG. 2, as well as any other operations).

Each computing device 300 also can include one or more input/output interface devices 310 (referred to as I/O interface 310) that can permit or otherwise facilitate external devices to communicate with the computing device 300. For instance, the I/O interface 310 may be used to receive and send data and/or instructions from and to an external computing device. The computing device 300 also includes one or more network interface devices 312 (referred to as network interface(s) 312) that can permit or otherwise facilitate functionally coupling the computing device 300 with one or more external devices. Functionally coupling the computing device 300 to an external device can include establishing a wireline connection or a wireless connection between the computing device 300 and the external device. The network interface devices 312 can include one or many antennas and a communication processing device that can permit wireless communication between a vehicle and either another vehicle or an external device. The other vehicle can be, for example, one of the vehicles included in the network 110 or an out-of-network vehicle. The external device can be, for example, one of the mobile devices included in the network 110. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A method comprising:

providing, by a first node of a distributed ledger network of nodes and to a first server, first information associated with the first node, wherein the first node is a vehicle, wherein the distributed ledger network of nodes includes a network of vehicles, wherein the network of vehicles includes a vehicle fleet, wherein the vehicle fleet includes the vehicle, wherein the first information includes vehicle configuration data associated with the vehicle and applicable to another vehicle of the vehicle fleet, and wherein the vehicle configuration data includes at least one of a trim level or type of the vehicle, fuel economy data for the vehicle, a capture of configuration settings stored at the vehicle, and a module update history of the vehicle;

receiving, by a ledger of the first node and from the first server, a pointer to the first information that is stored at the first server, wherein the pointer is stored in the ledger, and wherein the ledger is a distributed ledger included in all of the nodes of the distributed ledger network of nodes;

sending, from a second node of the distributed ledger network of nodes and based on the pointer, a request to access the first information stored on the first server;

receiving, by the second node and based on a determination that the second node has permission to access the first server, the first information on the first server associated with the pointer; and performing, by the second node, a configuration of the second node, the configuration based on the first information received from the first server.

2. The method of claim 1, further comprising:

sending, from a second node of the distributed ledger network of nodes and based on the pointer, a request to access the first information stored on the first server;

receiving, at the second node and based on a determination that the second node has permission to access the first server, the first information from the server;

sending, from a third node of the distributed ledger network of nodes and based on the pointer, a request to access the first information stored on the first server; and receiving, based on a determination that the third node does not have permission to access the first server, an indication that the third node does not have access to the first information.

3. The method of claim 1, wherein the distributed ledger network of nodes includes a blockchain.

4. The method of claim 1, wherein the first server is configured to store information of a first type, and wherein storing the first information at the first server is further based on a determination that the first information is of the first type.

* * * * *